(12) United States Patent
Kang et al.

(10) Patent No.: US 12,147,143 B2
(45) Date of Patent: Nov. 19, 2024

(54) OPTICAL PHASED ARRAY RADIATOR

(71) Applicants: Hyundai Motor Company, Seoul (KR); Kia Corporation, Seoul (KR); Korea Advanced Institute of Science and Technology, Daejeon (KR)

(72) Inventors: Chan-Hee Kang, Incheon (KR); Hyun-Woo Rhee, Daejeon (KR); Hyeon-Ho Yoon, Daejeon (KR); Nam-Hyun Kwon, Daejeon (KR); Hyo-Hoon Park, Daejeon (KR); Geum-Bong Kang, Daejeon (KR)

(73) Assignees: Hyundai Motor Company, Seoul (KR); Kia Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 18/373,482

(22) Filed: Sep. 27, 2023

(65) Prior Publication Data

US 2024/0027868 A1 Jan. 25, 2024

Related U.S. Application Data

(62) Division of application No. 17/528,628, filed on Nov. 17, 2021, now abandoned.

(30) Foreign Application Priority Data

Feb. 3, 2021 (KR) .................. 10-2021-0015562

(51) Int. Cl.
*G02F 1/295* (2006.01)

(52) U.S. Cl.
CPC .................. *G02F 1/2955* (2013.01)

(58) Field of Classification Search
CPC ......... G02F 1/2955; G02F 1/292; G01S 7/481
See application file for complete search history.

(56) References Cited

U.S. PATENT DOCUMENTS 8,565,643 B2 10/2013 Kim et al.
10,101,630 B2 * 10/2018 Watts ....................... G02F 1/225
2011/0274462 A1 11/2011 Kim et al.

FOREIGN PATENT DOCUMENTS

KR 2011-0123961 A 11/2011
KR 101702436 B1 2/2017

* cited by examiner

*Primary Examiner* — John Bedtelyon
(74) *Attorney, Agent, or Firm* — Fox Rothschild LLP

(57) ABSTRACT

An optical phased array (OPA) radiator includes a plurality of unit radiators configured to serve as optical waveguides, each of the unit radiators being made of a silicon material and each having a predetermined length, where the unit radiators are disposed in parallel; a cladding portion configured to cover the plurality of unit radiators; and a plurality of electrodes arranged in parallel with the plurality of unit radiators on the cladding portion, where the plurality of electrodes are arranged so as not to overlap the plurality of unit radiators in a vertical direction. A beam radiated through the unit radiators using a phased array can be efficiently vertically steered.

7 Claims, 9 Drawing Sheets

OPTICAL PHASED ARRAY RADIATOR

CROSS-REFERENCES TO RELATED APPLICATIONS

This Application is a Division of application Ser. No. 17/528,628 filed on Nov. 17, 2021. Application Ser. No. 17/528,628 claims the benefit of Korean Patent Application No. 10-2021-0015562 filed on Feb. 3, 2021 in the Korean Intellectual Property Office (KIPO), the entire contents of which are incorporated herein by reference in their entirety.

BACKGROUND

(a) Technical Field

The present disclosure relates to an optical phased array (OPA) radiator using a thermo-optical effect based on optical phased arrays.

(b) Description of the Related Art

In order to detect a location or shape of an object at a long distance, a radio detection and ranging (RADAR) technique using electromagnetic waves has been used in various fields for a long period of time. Recently, by developing such a detection technique, a more precise, faster, and miniaturized light detection and ranging (LiDAR) technique has been developed. The LiDAR technique using light is regarded as a core technique of next-generation major industry fields such as an autonomous vehicle field, a wireless optical communication field, and a three-dimensional (3-D) sensing field.

Among constituents of the LiDAR, a radiator for emitting a collimated beam in a desired direction is an important component. As shown in FIG. 1 (RELATED ART), a typical structure of the radiator includes a plurality of grating radiators 110 that are arranged in parallel as a basic unit and being capable of adjusting a horizontal direction of a collimating beam emitted from a grating radiator array by adjusting a phase difference between pieces of light 130 which input to the plurality of grating radiators 110. In this case, a size of a horizontal viewing angle (a horizontal radiation angle), which is a steerable maximum range, has a characteristic of being inversely proportional to an arrangement interval between grating radiator arrays, and when the arrangement interval is half a wavelength of the input light 130, a maximum horizontal viewing angle (a maximum horizontal radiation angle) can be obtained.

In addition, as shown in Equation 1 below, in the grating radiator array, a vertical radiation angle of a radiation beam is determined according to a grating period and an effective refractive index $n_{eff}$. A vertical direction of a collimated beam which is radiated can be adjusted by adjusting a temperature of the grating radiator array and the effective refractive index $n_{eff}$ using the vertical radiation angle.

$$\sin\theta_m = n_{eff} - m\frac{\lambda}{\Lambda} \quad \text{[Equation 1]}$$

Joule heating is used so as to adjust the temperature of the grating radiator array, a metal and a high concentration doping region are used as a conductive line 120, and an intrinsic silicon region constituting the grating radiator array is used as resistance, thereby adjusting the Joule heating.

Referring FIG. 2 (RELATED ART) and FIG. 3 (RELATED ART), which is a cross-sectional view taken along line A-A' of FIG. 2, n grating radiators 213 (n=128, 256, . . . ) are arranged as high refractive silicon optical waveguides, and a cladding portion 211 of a low refractive silica cladding is provided in the form of covering the n grating radiators 213.

A resistor capable of adjusting a temperature of a grating structure is disposed in an electrode structure for adjusting the vertical radiation angle of the beam emitted from the grating radiator array, and an electrode 214 and a conductive line 216 are included so as to supply power to the resistor.

In order to acquire a temperature variation of the grating radiator array, a high concentration doping region 215 for supplying power is formed in the grating radiator array.

The resistor arrangement according to the related art cannot expect a uniform temperature variation in the entire region of the grating radiator array.

That is, due to a physical structure of the intrinsic silicon region (i region) and non-uniform resistance, a non-uniform temperature distribution occurs to cause phase non-uniformity of laser light. Thus, as shown in FIG. 4, instability of the laser light may occur.

A distance between electrodes is determined according to an overall width of the grating radiator array, and as the grating radiator array has better performance, the distance between electrodes is increased.

However, as the overall width of the grating radiator array is increased, a probability of occurrence of an unbalance in resistance is further increased due to a process error and the like. In addition, since an increase in the distance between the electrodes leads to an increase in resistance of the grating radiator array, application of a higher voltage is required.

When a higher voltage is applied to heat the grating radiator array, non-uniformity in temperature occurs due to an imbalance in resistance and thus an effective refractive index of each portion is varied. Therefore, beam performance may be degraded by affecting a divergence angle which is collimated through a phase arrangement.

In addition, due to the application of the higher voltage, a total amount of heat being applied is increased. Thus, since local heating due to an imbalance of resistance affects durability of the grating radiator array, damage may occur in a grating radiator.

The contents described in the above Description of Related Art are to aid understanding of the background of the present disclosure and may include what is not previously known to those skilled in the art to which the present disclosure pertains.

SUMMARY

An embodiment of the present disclosure is directed to an optical phased array (OPA) radiator for efficiently vertically steering a beam radiated from a radiator through an OPA.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided an OPA radiator which includes a plurality of unit radiators configured to serve as optical waveguides, each of the unit radiators being made of a silicon material and each having a predetermined length, where the unit radiators are disposed in parallel; a cladding portion configured to cover the plurality of unit radiators; and a plurality of electrodes arranged in parallel with the plurality of unit radiators on the cladding portion, wherein the plurality of electrodes are arranged so as not to overlap the plurality of unit radiators in a vertical direction.

In addition, the plurality of electrodes may be arranged between the plurality of unit radiators in the vertical direction.

In addition, the OPA radiator may further include doping regions formed in a base portion below the plurality of unit radiators to correspond to in number to the plurality of electrodes, respectively, and conductive lines configured to connect the plurality of electrodes to a plurality of doping regions.

In addition, the plurality of doping regions may be arranged so as not to overlap the plurality of unit radiators in the vertical direction.

Here, the cladding portion may be a silica cladding having a refractive index that is lower than a refractive index of the unit radiator.

In addition, the plurality of unit radiators may have a same interval, and an irregular structure may be formed in each of the unit radiators at the same interval in a lengthwise direction.

In accordance with another embodiment of the present disclosure, there is provided an OPA radiator which includes a plurality of unit radiators configured to serve as optical waveguides, each of the unit radiators being made of a silicon material and each having a predetermined length, where the unit radiators are disposed in parallel; a cladding portion configured to cover the plurality of unit radiators; first electrodes disposed to be spaced apart from each other on one side of an upper surface of the cladding portion in a widthwise direction of the cladding portion; and second electrodes disposed to be spaced apart from each other and to be opposite to the first electrodes on the other side of the upper surface of the cladding portion in the widthwise direction of the cladding portion.

In addition, the OPA radiator may further include a plurality of doping regions formed in a base portion below the plurality of unit radiators and arranged so as not to overlap the plurality of unit radiators in a vertical direction, and conductive lines configured to connect the plurality of doping regions to the first electrodes or the second electrodes.

In addition, the plurality of doping regions may be arranged between the plurality of unit radiators.

In addition, the plurality of unit radiators may have a same interval, and an irregular structure may be formed in each of the unit radiators at the same interval in a lengthwise direction.

In addition, each of the plurality of unit radiators may be divided into an irregular structure region in which the irregular structure is formed and a non-irregular structure region in which the irregular structure is not formed, and each of the plurality of unit radiators may be tapered such that a width is gradually decreased as being away from the irregular structure region.

In addition, each of the plurality of doping regions may be divided into a first doping region corresponding to a region which corresponds to the irregular structure region and a second doping region corresponding to a region which corresponds to the non-irregular structure region, and each of the plurality of doping regions may be tapered such that a width is gradually increased as being away from the first doping region.

In addition, the conductive line may be connected to the second doping region of each of the plurality of doping regions.

In addition, the cladding portion may be a silica cladding having a refractive index that is lower than a refractive index of the unit radiator.

DESCRIPTION OF SPECIFIC EMBODIMENTS

Figure 1:
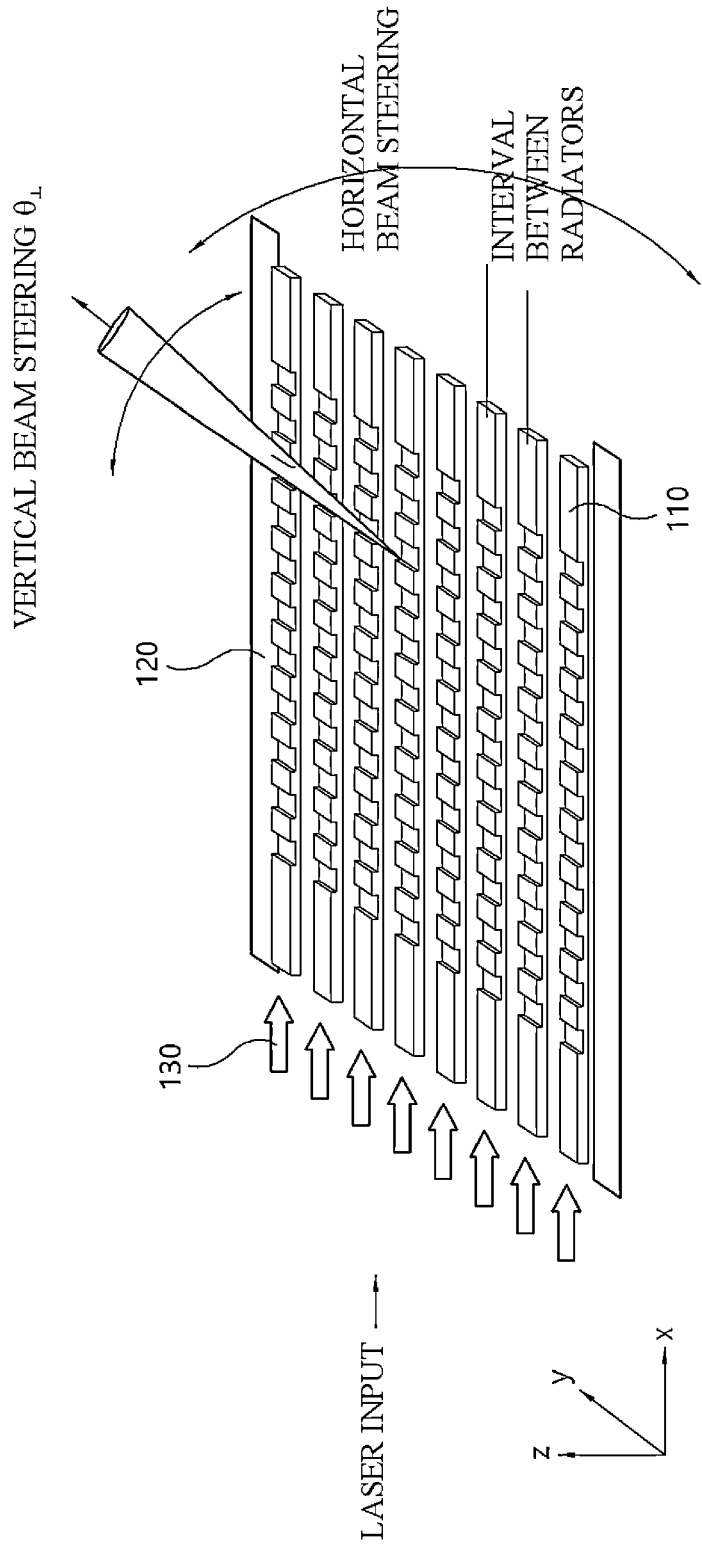
FIGS. 1 to 3 (RELATED ART) are diagrams illustrating a grating radiator array according to the related art.
Figure 2:
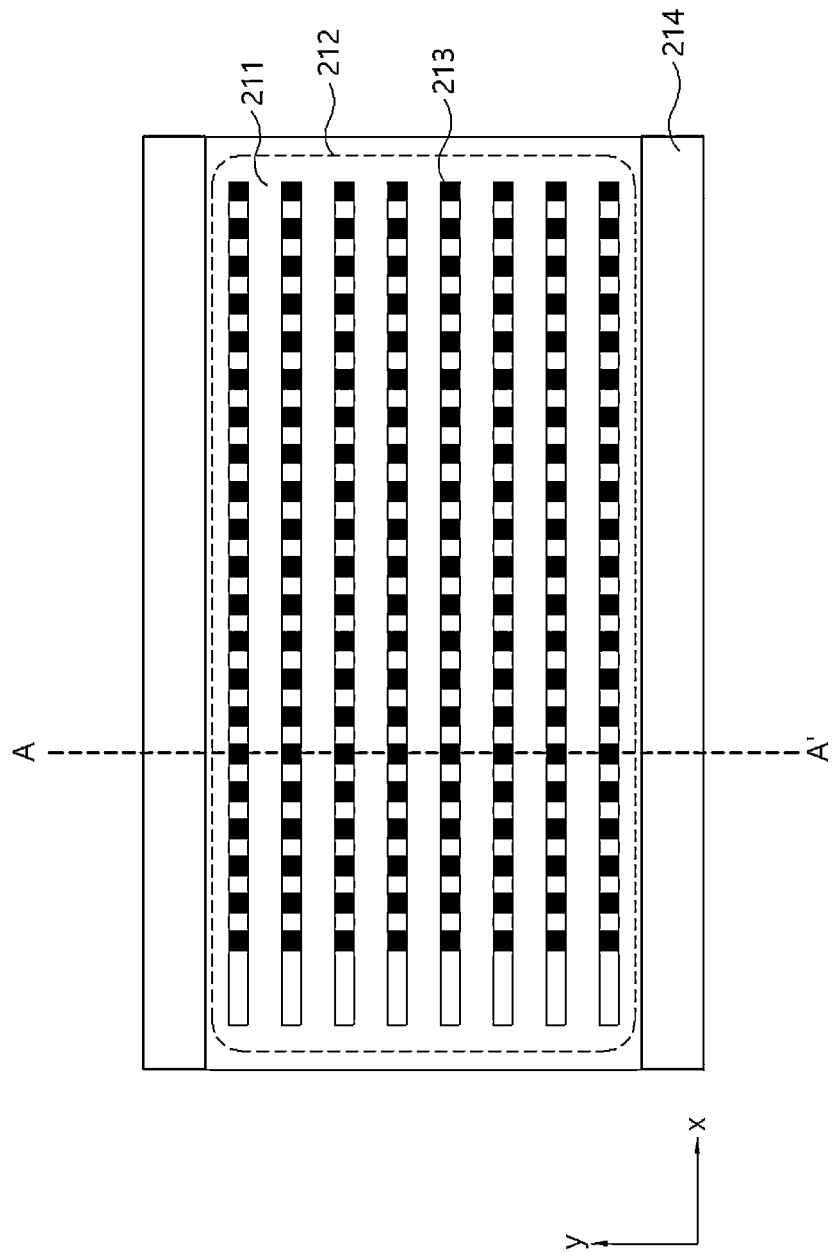
Figure 3:
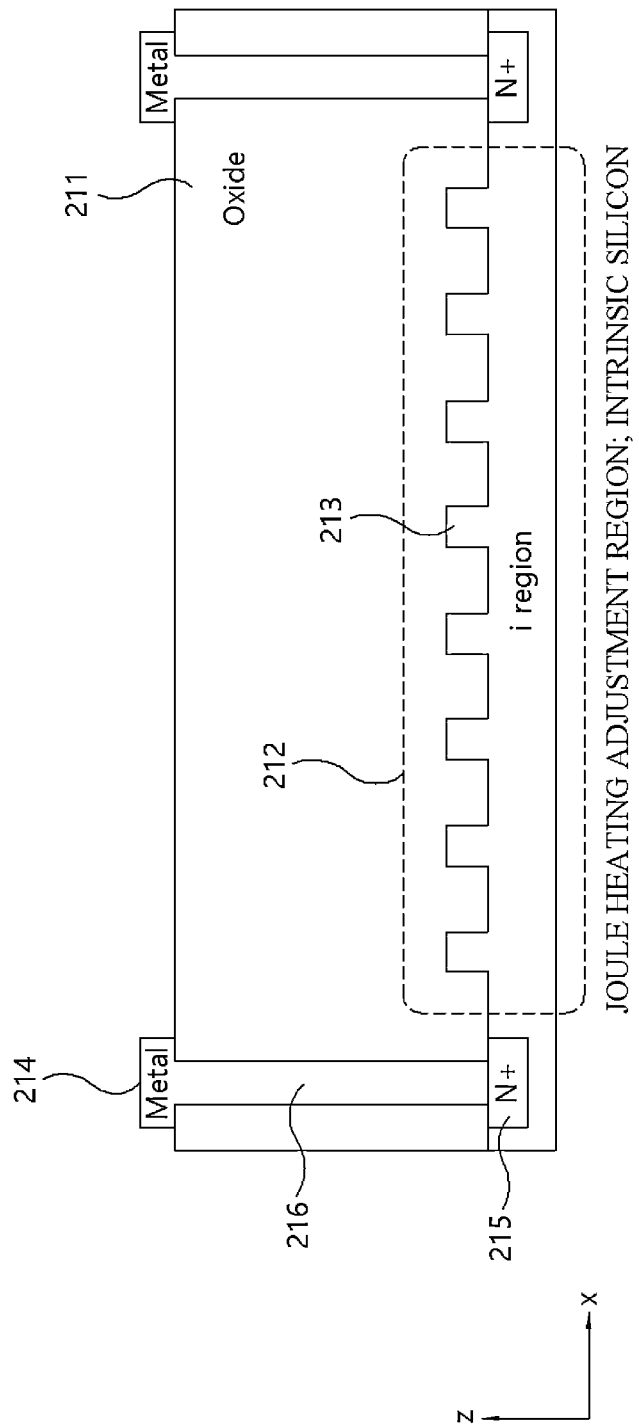
Figure 4:
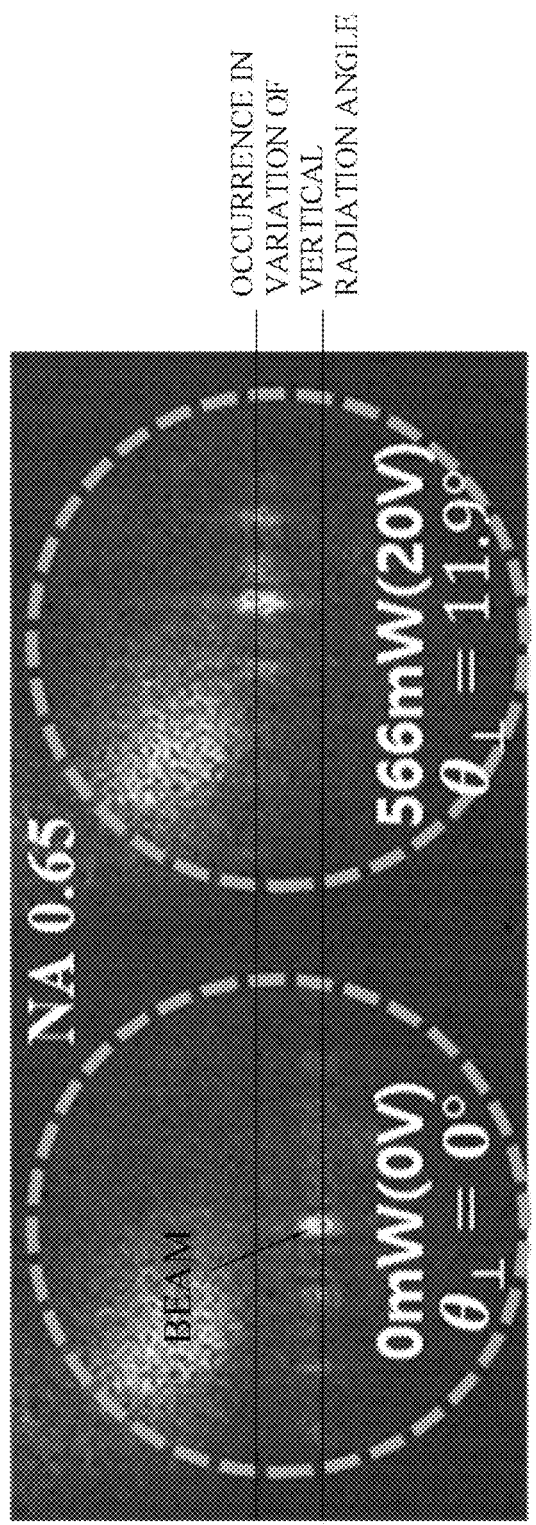
FIG. 4 is a diagram illustrating a difference in vertical radiation angle due to heat according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to fully understand the present disclosure and operational advantages of the present disclosure and objects attained by practicing the present disclosure, reference should be made to the accompanying drawings that illustrate exemplary embodiments of the present disclosure and to the description in the accompanying drawings.

In describing exemplary embodiments of the present disclosure, known technologies or repeated descriptions may be reduced or omitted to avoid unnecessarily obscuring the gist of the present disclosure.

Figure 5:
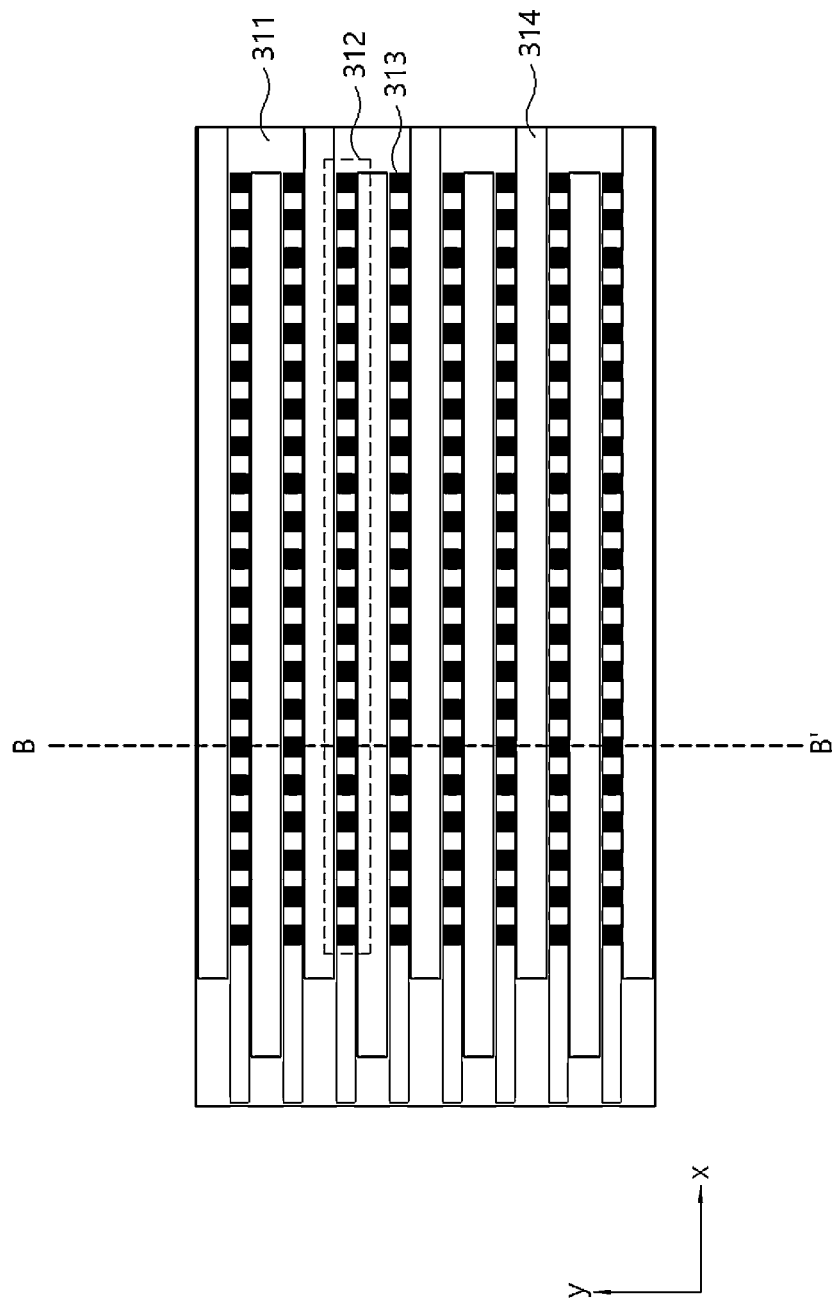
FIG. 5 is a plan cross-sectional view illustrating an optical phased array (OPA) radiator according to one embodiment of the present disclosure.
Figure 6:
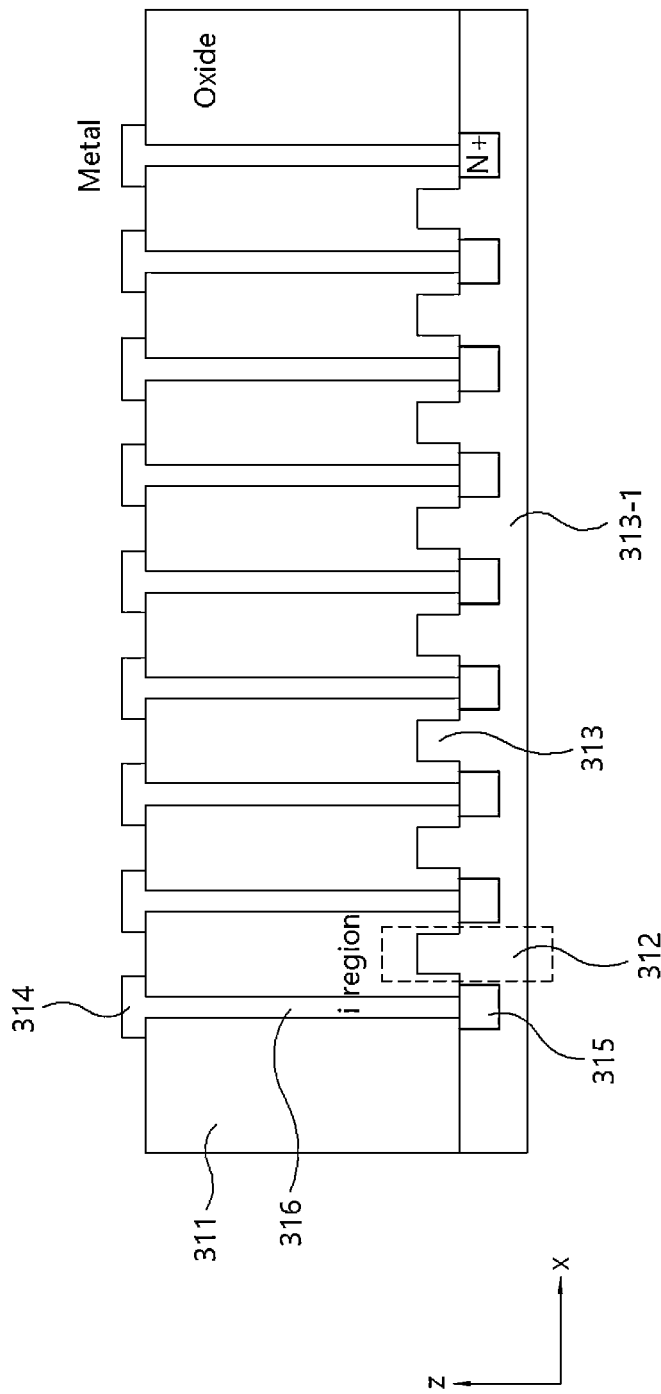
FIG. 6 is a cross-sectional view taken along line B-B' of FIG. 5.

FIG. 5 is a plan cross-sectional view illustrating an optical phased array (OPA) radiator according to one embodiment of the present disclosure, and FIG. 6 is a cross-sectional view taken along line B-B' of FIG. 5.

Hereinafter, an OPA radiator according to one embodiment of the present disclosure will be described with reference to FIGS. 5 and 6.

The OPA radiator according to one embodiment of the present disclosure includes N unit radiators 313 each of which has a predetermined length, the N unit radiators 313 being arranged in parallel and connected by a base portion 313-1 below the N unit radiators 313, and a cladding portion 311 configured to cover each unit radiator 313. The OPA radiator preferably is implemented on an inner flat surface of a chip.

The unit radiator 313 is an optical waveguide made of silicon having a high refractive index, and a phase-adjusted beam is transmitted through the unit radiator 313 in a lengthwise direction.

The cladding portion 311 is a silica cladding having a low refractive index of silicon oxide ($SiO_2$) and allows a beam to be transmitted through the unit radiator 313.

The plurality of unit radiators 313 are formed to have different heights at equal intervals in the lengthwise direction so that an irregular structure is formed.

The plurality of unit radiators 313 are disposed at predetermined intervals and have a characteristic in which, as the interval is decreased, a horizontal viewing angle (a horizontal radiation angle) of a steered beam radiated through the OPA radiator is increased. Thus, in order to obtain a wide horizontal viewing angle (a wide horizontal radiation angle), the interval between the unit radiators 313 may be smaller than or half of a wavelength of the steered beam.

In addition, in order to adjust the vertical radiation angle of the radiated steering beam, it is necessary to adjust an effective refractive index by adjusting a temperature of each unit radiator 313, and according to the present disclosure, the temperature of each unit radiator 313 is uniformly adjusted to solve a phase imbalance and prevent performance of a vertically steered radiation beam from being degraded.

To this end, a plurality of electrodes 314, which are parallel to the lengthwise direction of the unit radiator 313 on the cladding portion 311 and are arranged between the unit radiators 313, are formed. That is, the plurality of electrodes 314 are arranged so as not to overlap the plurality of unit radiators 313 in the vertical direction.

In addition, in order to uniformly adjust the temperature of the OPA radiator, a plurality of high-concentration doping regions 315 are formed and each of the doping region 315 is electrically connected to a corresponding electrode 314 by a conductive line 316.

The doping region 315 is formed in the base portion 313-1 on a side of each unit radiator 313, including between the unit radiators 313, and arranged parallel to the unit radiator 313 so that the doping region 315 serves as a resistor in an intrinsic region 312 to adjust Joule heating.

Consequently, it is possible to uniformly adjust a variation in temperature of all the unit radiators 313 and to minimize deterioration of beam performance when a vertical beam is steered as compared to the related art.

Figure 7:
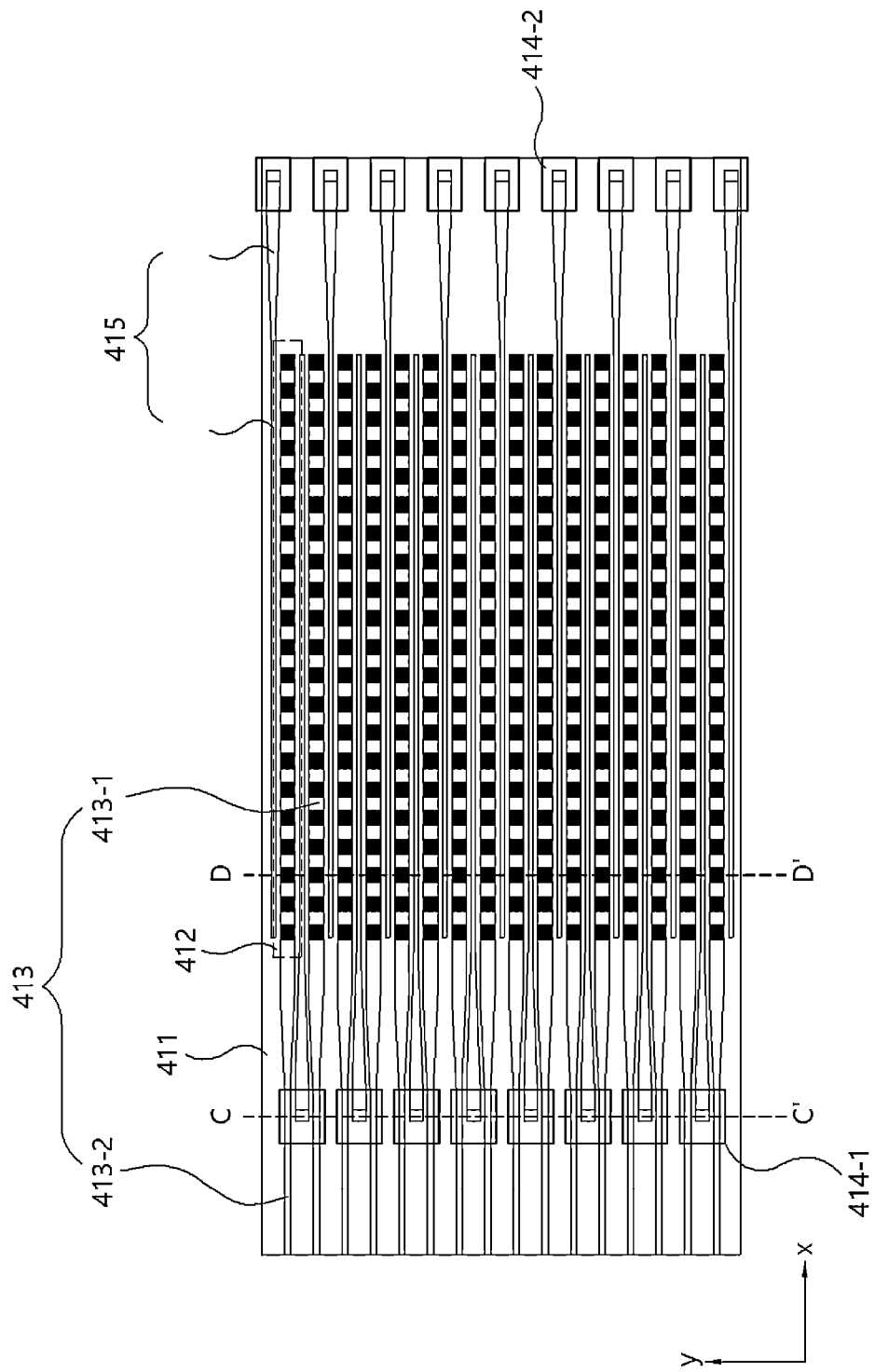
FIG. 7 is a plan cross-sectional view illustrating an OPA radiator according to a modified embodiment of the present disclosure.
Figure 8:
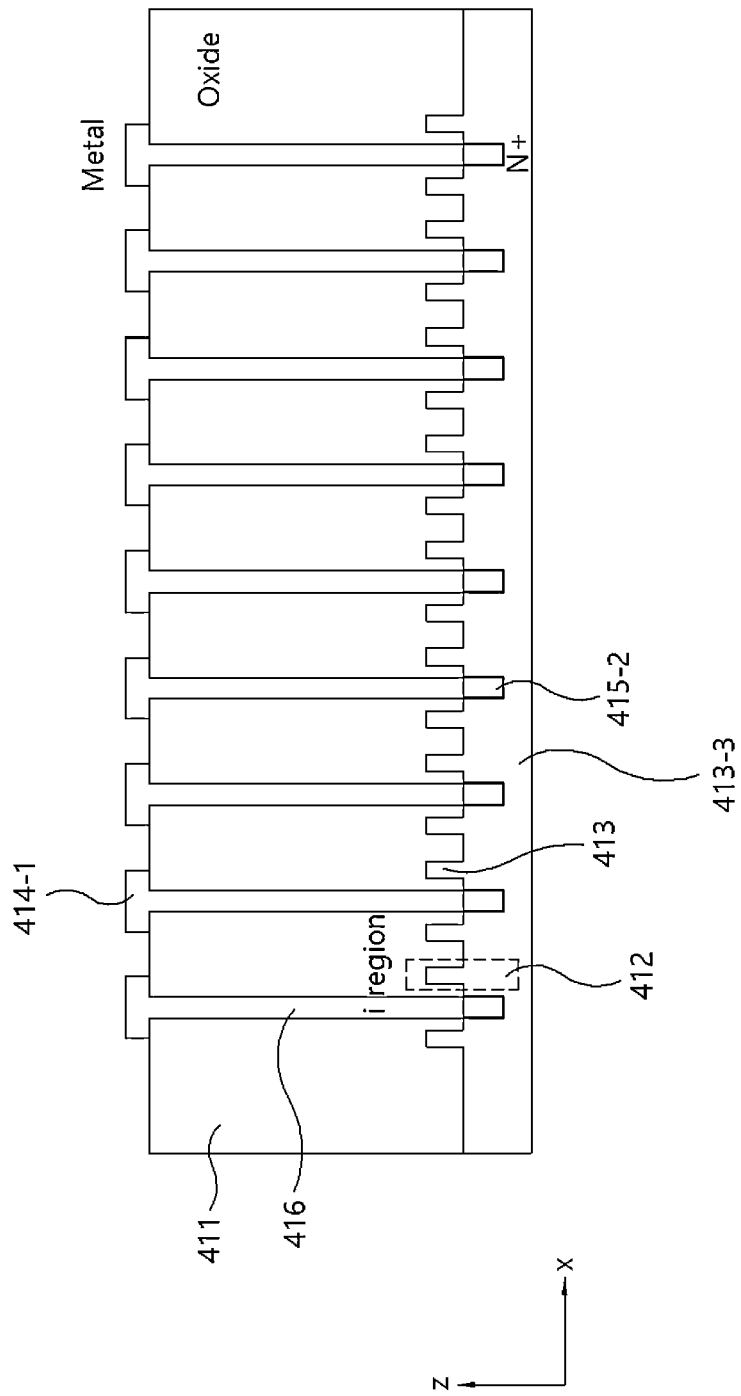
FIG. 8 is a cross-sectional view taken along line C-C' of FIG. 7.
Figure 9:
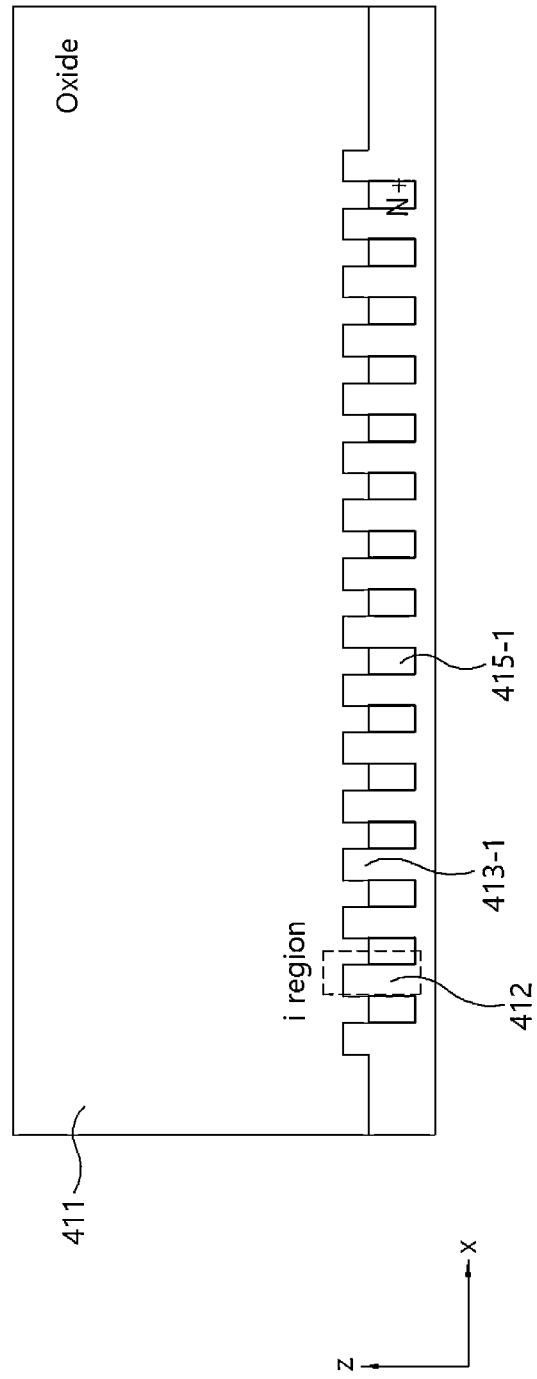
FIG. 9 is a cross-sectional view taken along line D-D' of FIG. 7.

FIG. 7 is a plan cross-sectional view illustrating an OPA radiator according to a modified embodiment of the present disclosure, FIG. 8 is a cross-sectional view taken along line C-C' of FIG. 7, and FIG. 9 is a cross-sectional view taken along line D-D' of FIG. 7.

Hereinafter, an OPA radiator according to a modified embodiment of the present disclosure will be described with reference to FIGS. 7 to 9.

The OPA radiator according to a modified embodiment of the present disclosure includes N unit radiators 413 each of which has a predetermined length, the N unit radiators 413 being arranged in parallel on a base portion 413-3, and a cladding portion 411 configured to cover the N unit radiators 413.

The unit radiator 413 is an optical waveguide made of silicon having a high refractive index, and a phase-adjusted beam is transmitted through the unit radiator 413 in a lengthwise direction.

The cladding portion 411 is a silica cladding having a low refractive index and allows a beam to be transmitted through the unit radiator 413.

The plurality of unit radiators 413 are formed to have different heights at equal intervals in the lengthwise direction so that an irregular structure is formed.

Each of the unit radiators 413 may be divided into an irregular structure region 413-1, in which an irregular structure is formed, and a non-irregular structure region 413-2. A width of the irregular structure region 413-1 is kept constant, and a width of the non-irregular structure region 413-2 has a tapered structure in which the width is gradually decreased as being away from the irregular structure region 413-1.

This is to solve a problem in that, when an interval between the unit radiators 413 is narrow in order for a wide horizontal radiation angle, a doping region 415 and a conductive line 416 cannot be disposed between the unit radiators 413 due to a limitation of a process. Due to deformation of the unit radiator 413, an electrode, which will be described below, and the doping region 415, the doping region 415 and the conductive line 416 are allowed to be disposed between the unit radiators 413. Consequently, it is possible to prevent exceeding of an allowable current limit which may occur when a narrow width is connected.

In addition, a plurality of electrodes are formed on the cladding portion 411. Unlike the above embodiment, first electrodes 414-1 are formed on one side of an upper surface of the cladding portion 411 and spaced apart from each other in a widthwise direction of the cladding portion 411, and second electrodes 414-2 are formed to opposite to the first electrodes 414-1 on the other side of the upper surface of the cladding portion 411 and spaced apart from each other in the widthwise direction of the cladding portion 411. The first electrodes 414-1 and the second electrodes 414-2 are formed as a plurality of first electrodes 414-1 and a plurality of second electrodes 414-2, respectively, and spaced apart from each other in the widthwise direction of the cladding portion 411.

In addition, in order to uniformly adjust the temperature of the OPA radiator, a plurality of high-concentration doping regions 415 are formed and each of the doping region 415 is electrically connected to a corresponding electrode 414 by the conductive line 416.

The doping region 415 is formed in the base portion 413-3 on a side of each unit radiator 413, including between the unit radiators 413, thereby adjusting Joule heating as resistance in an intrinsic region 412.

Consequently, it is possible to uniformly adjust a variation in temperature of all the unit radiators 413.

Thus, positions of the conductive line 416 connecting the doping region 415 to the electrodes 414-1 and 414-2 on a surface of the chip are disposed out of a range of the OPA radiator.

Meanwhile, the doping region 415 may be divided into a doping region connected to the first electrode 414-1 and a doping region connected to the second electrode 414-2.

In addition, each doping region 415 may be divided into a first doping region 415-1 corresponding to a region which corresponds to the irregular structure region 413-1 of the unit radiator 413 in the lengthwise direction, and a second doping region 415-2 corresponding to a region which corresponds to the non-irregular structure region 413-2 in the lengthwise direction. A width of the first doping region 415-1 is kept constant, and a width of the second doping region 415-2 has a tapered structure in which the width is gradually increased as being away from the first doping region 415-1 and being close to positions corresponding to the first and second electrodes 414-1 and 414-2.

Therefore, since the conductive line 416 is connected to the second doping region 415-2 having the width that is greater than the width of the first doping region 415-1, a wider conductive line can be connected.

As described above, according to the modified embodiment, when the interval between the unit radiators is narrow, in order to improve the performance of the OPA radiator, it is possible to overcome a process limitation and solve a problem in that the doping region 415 and the conductive line 416 cannot be disposed between the unit radiators 413, and due to the tapered structure, it is possible to prevent exceeding of the allowable current limit which may occur when a narrow width is connected.

In accordance with an optical phased array (OPA) radiator according to the present disclosure, a high-concentration doping region applied to a conventional radiator array is disposed between grating radiators, and thus the high-concentration doping region serves as an electrode and the grating radiator serves as a resistor so that heat can be uniformly applied to all regions of a grating radiator array.

In addition, the interval between grating radiators is reduced so that a wide horizontal viewing angle can be obtained. In this case, due to the reduction in interval, it is possible to solve difficulty of a process of forming the high-concentration doping region and a metal conductive line for connecting the high-concentration doping region to a surface of a chip.

In addition, a local temperature limit and exceeding of an allowable current due to an increase in interval between the grating radiators can be prevented so that durability of the grating radiator can be increased.

In addition, it is possible to maintain a horizontal steering direction of a beam, which is steered and radiated from a single-surface light emission OPA radiator, in a horizontal direction and adjust a vertical divergence angle of the beam.

In addition, in an application field in which an object is detected using a radiation beam, there is an advantage in that a vertical resolution can be improved by decreasing the vertical divergence angle, and a detection distance can be increased by reducing diffusion of the beam.

While the present disclosure has been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. An optical phased array (OPA) radiator, comprising:
   a plurality of unit radiators configured to serve as optical waveguides, each of the unit radiators being made of a silicon material and each having a predetermined length, wherein the unit radiators are disposed in parallel;
   a cladding portion configured to cover the plurality of unit radiators;
   first electrodes disposed on one side of an upper surface of the cladding portion and spaced apart from each other in a widthwise direction of the cladding portion; and
   second electrodes disposed opposite to the first electrodes on an other side of the upper surface of the cladding portion and spaced apart from each other in the widthwise direction of the cladding portion;
   wherein each of the plurality of unit radiators is divided into an irregular structure region in which an irregular structure is formed and a non-irregular structure region in which the irregular structure is not formed; and
   wherein each of the plurality of unit radiators in the non-irregular structure region is tapered such that a width is gradually decreased from the irregular structure region towards the first electrodes.

2. The OPA radiator of claim 1, further comprising:
   a plurality of doping regions formed in a base portion below the plurality of unit radiators and arranged so as not to overlap the plurality of unit radiators in a vertical direction; and
   conductive lines configured to connect the plurality of doping regions to the first electrodes or the second electrodes.

3. The OPA radiator of claim 2, wherein the plurality of doping regions are arranged between the plurality of unit radiators.

4. The OPA radiator of claim 3, wherein the plurality of unit radiators have a same interval, and an irregular structure is formed in each of the unit radiators at the same interval in a lengthwise direction.

5. The OPA radiator of claim 1, wherein:
   each of the plurality of doping regions is divided into a first doping portion corresponding to a region which corresponds to the irregular structure region and a second doping portion corresponding to a region which corresponds to the non-irregular structure region; and
   each of the plurality of doping regions is tapered such that a width is gradually increased as being away from the first doping region.

6. The OPA radiator of claim 5, wherein the conductive line is connected to the second doping region of each of the plurality of doping regions.

7. The OPA radiator of claim 1, wherein the cladding portion includes a silica cladding having a refractive index that is lower than a refractive index of the unit radiator.

* * * * *